Figure 3:
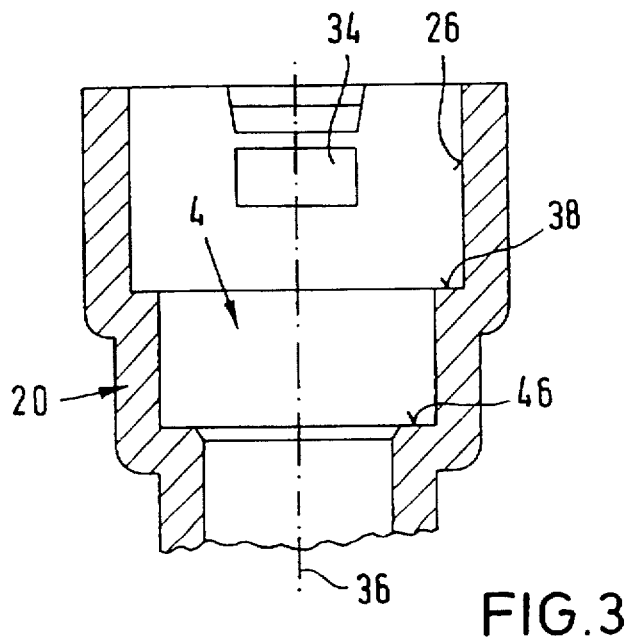

United States Patent [19]
Brandt

[11] Patent Number: 5,782,501
[45] Date of Patent: Jul. 21, 1998

[54] CONNECTING MECHANISM FOR CONNECTING A PIPELINE TO A UNIT PART

[75] Inventor: Josef Brandt, Wipperfürth, Germany

[73] Assignee: Armaturenfabrik Hermann Voss GmbH & Co., Wipperfürth, Germany

[21] Appl. No.: 619,428

[22] Filed: Mar. 21, 1996

[30] Foreign Application Priority Data

Mar. 21, 1995 [DE] Germany ............ 195 10 192.8

[51] Int. Cl.⁶ ................... F16L 35/00; F16L 39/00
[52] U.S. Cl. ................. 285/81; 285/189; 285/319; 285/307; 285/332; 285/285; 285/921
[58] Field of Search .................. 285/189, 192, 285/211, 213, 215, 319, 322, 323, 921, 305, 308, 307, 81

[56] References Cited

U.S. PATENT DOCUMENTS

| | | | |
|---|---|---|---|
| 3,314,228 | 9/1967 | Miller | 285/322 X |
| 4,696,495 | 9/1987 | Oliver | 285/281 X |
| 4,887,849 | 12/1989 | Briet | 285/319 X |
| 5,204,499 | 4/1993 | Favalora | 285/921 X |
| 5,314,216 | 5/1994 | Umezawa | 285/319 |
| 5,395,139 | 3/1995 | Morrison | 285/319 X |

FOREIGN PATENT DOCUMENTS

| | | |
|---|---|---|
| 3011430 | 10/1981 | Germany. |
| 3105917 | 2/1982 | Germany. |
| 4007101 | 7/1991 | Germany. |
| 2073350 | 10/1981 | United Kingdom. |
| 2165604 | 4/1986 | United Kingdom. |

Primary Examiner—Terry Lee Melius
Assistant Examiner—Heather Shackelford

[57] ABSTRACT

A connecting mechanism for connecting at least one plastic pipeline to a mating opening in a unit part. The connecting mechanism has a housing with a plug-in section selectively connectable to a mating opening on the unit part. The housing has a receiver opening for plugging in a pipeline. and a retainer is arranged in the receiver opening to lock onto a pipeline plugged therein. The plug-in section of the housing has at least one radially elastic arm having a locking catch to clamp behind a surface of the unit part, thereby interconnecting the housing with the unit part. When a pipeline is inserted into the receiver opening of the housing. the pipeline coacts with the locking arm or arms to exclude a radial detaching movement of the locking arm. that otherwise would disengage the locking catches from the unit part.

10 Claims, 3 Drawing Sheets

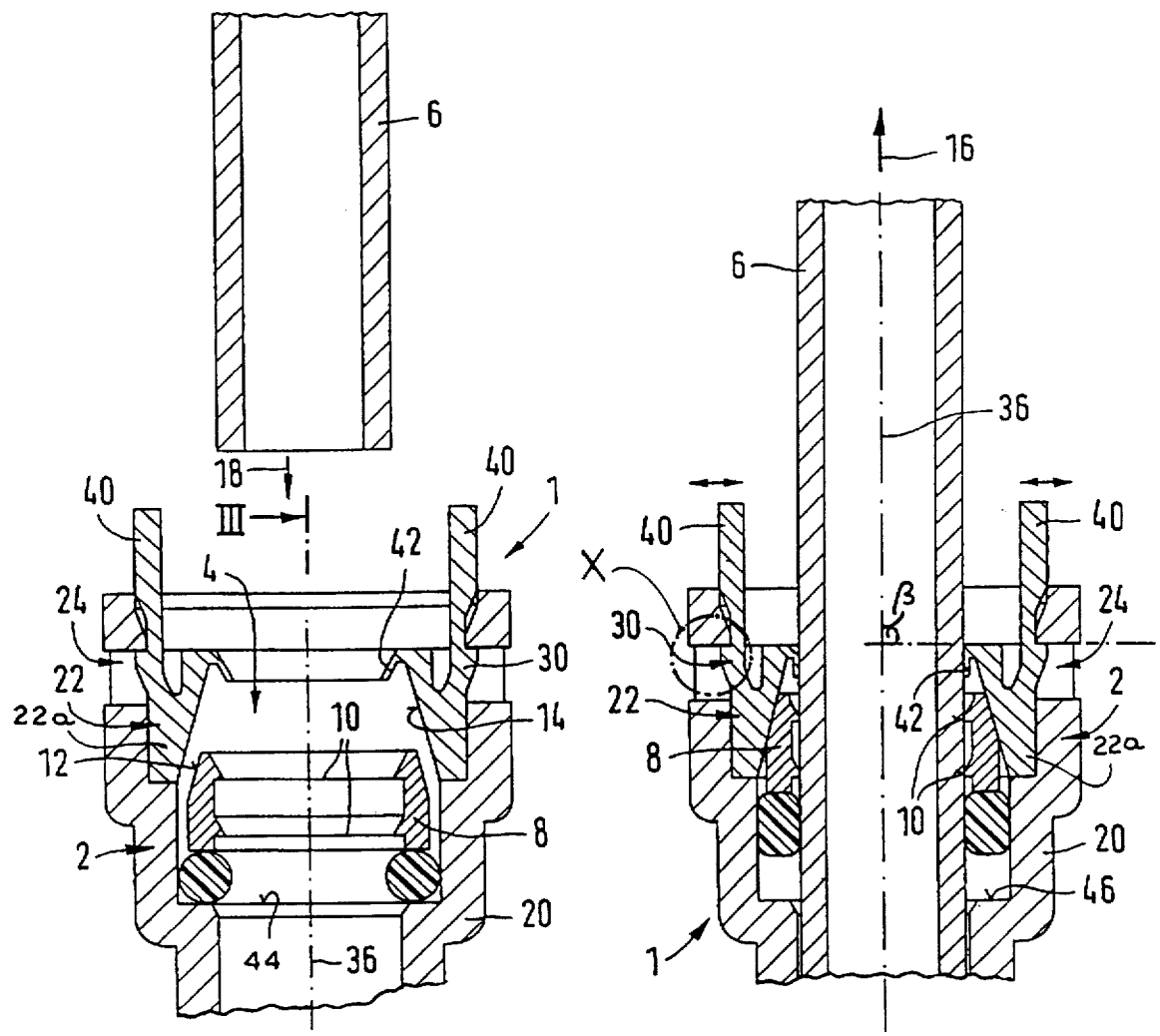
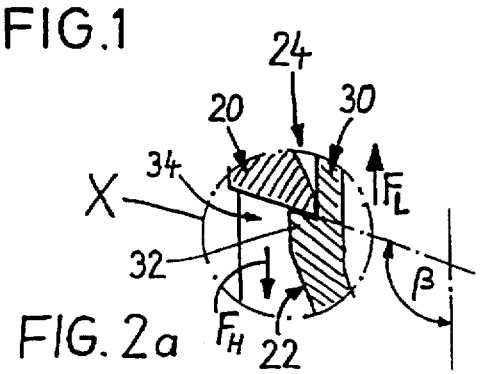
FIG.1  FIG.2  FIG.2a

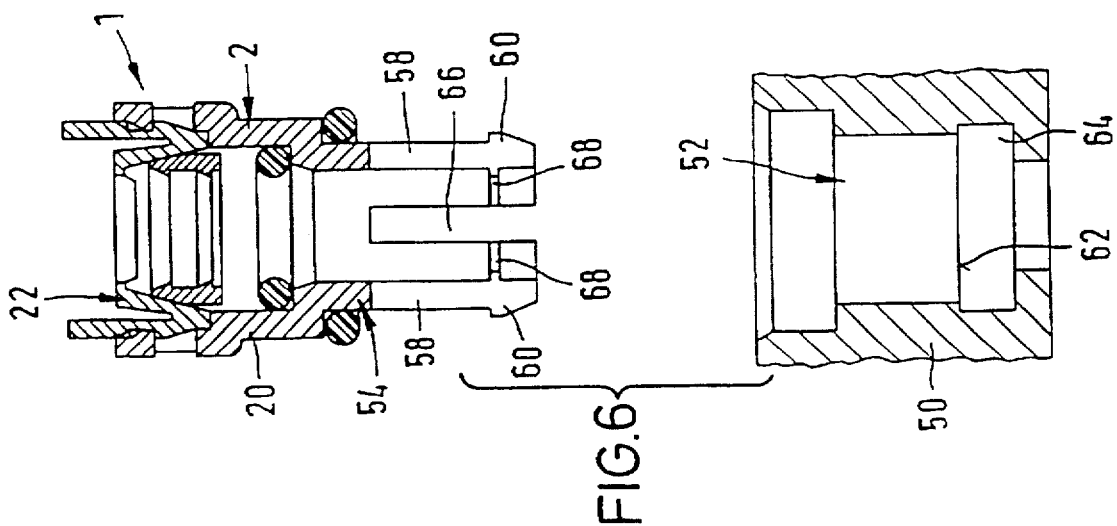

CONNECTING MECHANISM FOR CONNECTING A PIPELINE TO A UNIT PART

The present invention pertains to a connecting mechanism for connecting at least one plastic pipeline to a unit part which is composed of a housing which can be connected to the unit part, said housing having at least one receiver opening for plugging in a pipeline and a retainer arranged in the receiver opening in order to lock a pipeline which has been plugged in.

DE OS 3,011,430 describes various executions of a socketless fitting for connecting a plastic pipeline to a unit part, e.g., in the form of a valve gate. In several of these executions, a housing in the form of a screwed piece or male fitting is screwed in the inner thread of a unit part, with a retainer in the form of a locking ring arranged in the toroidal chamber formed between the screwed piece and the unit part in order to lock the pipeline. In additional embodiments the housing which receives the pipeline and retainer is in the form of two parts, a screw neck and coupling ring, where a connecting shoulder featuring an outer thread of the screw neck is screwed in an inner thread of the unit part. These known embodiments, as a consequence—in particular, of the threaded connections—are very expensive to manufacture and very awkward to operate.

The underlying purpose of the present invention is to create a connecting mechanism of this generic class which is distinguished by means of a particularly simple operation, in particular, with respect to connection to the unit part, and which can be manufactured simply and economically.

This is achieved according to the invention by means of the housing featuring a plug-in section which can be plugged in, in a sealing manner, to a plug-in opening of the unit part, with the plug-in section being retained in the plug-in opening by means of a snap-action interlocking connection and the snap-action interlocking connection being locked against detaching by means of the pipeline which has been plugged in.

Consequently, in order to connect the housing to the unit part, it is only necessary to plug the plug-in section of the former in the plug-in opening of the unit part, until the locking connection according to the invention locks into place, thus causing a secure, interlocking mounting. In this regard, this locking connection according to the invention also is advantageously very secure from being unintentionally detached, e.g., due to pressure, since after the pipeline has been plugged in, it automatically prevents the locking means from becoming unlatched. In this regard, the individual parts of the connecting mechanism according to the invention are very simple and economical to manufacture, particularly, as plastic moldings.

Additional advantageous design features of the invention are included in the following description.

Figure 4:
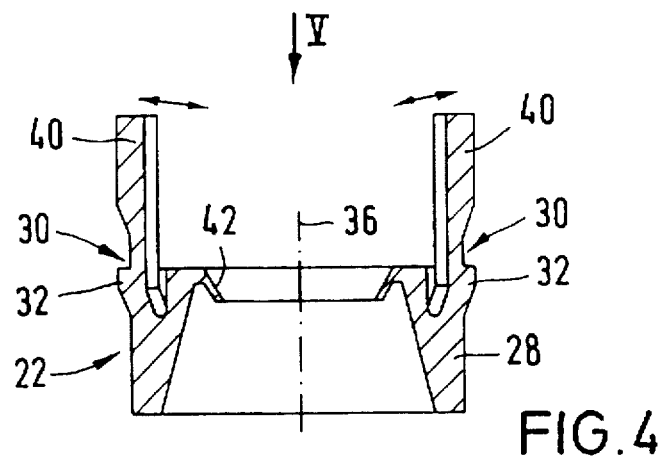
Figure 5:
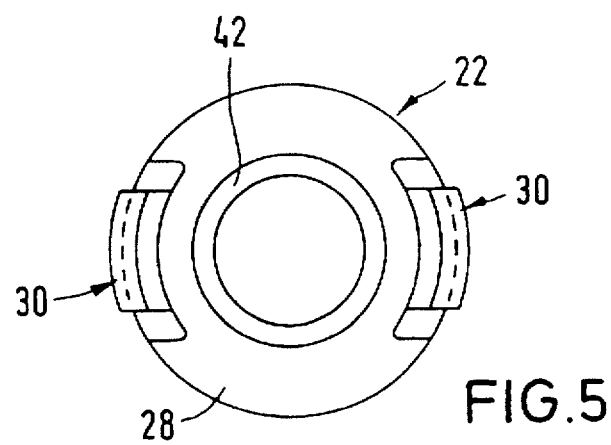

With the aid of the figures, the invention is more closely explained with examples. Shown are:

FIG. 1: A longitudinal section, with respect to the plug-in axis, of a preferred embodiment of a connecting mechanism with an additional representation of a pipeline before being been plugged in, FIG. 2: A view analogous to FIG. 1, with the pipeline plugged in and locked, FIG. 2a: An enlarged detail of region X in FIG. 2, in an advantageous configuration of the locking connection according to the invention, FIG. 3: A sectional view of cutting plane III—III, according to FIG. 1, of a base of the connecting mechanism (without internal parts), FIG. 4: A sectional view of the cutting plane of FIG. 1 of an insert of the connecting mechanism, which can be connected to the base of FIG. 3, FIG. 5: A top view of the insert in the direction of arrow V of FIG. 4, FIG. 6: A longitudinal section of the connecting mechanism analogous to FIG. 1, but in an embodiment according to the invention with an additional representation of an unit part, before connecting the latter, FIG. 7: A view analogous to FIG. 6, in a state where the connecting mechanism according to the invention is connected to the unit part, but before plugging in a pipeline and FIG. 8: A view analogous to FIG. 7, with the pipeline plugged in and locked.

In the different figures, like parts are always provided with like reference numbers.

As first revealed in FIGS. 1 and 2, a connecting mechanism (1) is composed of a housing with a receiver opening (4), open at one end, in order to plug in, in an axial direction, one end of a pipeline (6), and also a locking ring (8) arranged in the housing (2) or in the receiver opening (4), in order to lock the pipeline (6) plugged in on the line of the axis. Here, the connecting mechanism (1) enables the pipeline (6) to be mounted by simply plugging the latter into the housing (2), without additional mounting steps, since the connecting mechanism (1) with housing (2) and locking ring (8) is already fully assembled beforehand. The locking ring (8) is seated in an enlargement of the receiver opening (4) in such a way that the former surrounds the latter and, with this, also encloses the pipeline (6) which has been plugged in. One place in the circumference of the locking ring (8) features a slot which is continuous axially and radially, i.e., an interruption in the circumference, by which it can be expanded and contracted radially in an elastic manner. The inner circumference of the locking ring (8) features at least one peripheral cutting edge (10) projecting radially inward; however, two cutting edges (10) spaced apart from each other axially, are provided in the embodiment represented. The locking ring (8) also possesses an outer taper (12) which, in order to lock the pipeline, cooperates with an inner taper (14) of the housing (2) in such a way that when the pipeline (6) is pulled in the detaching direction (arrow 16 in FIG. 2), i.e., for a movement counter to the plug-in direction (arrow 18 in FIG. 1), the locking ring (8) is entrained by means of its cutting edges (10) making frictional engagement [with the pipeline], until the outer taper (12) of the latter comes to rest on the inner taper (14) of the housing (2). Further tension generates a force directed radially inward, on the tapers (12,14) which elastically narrows—in a conventionally known manner—the locking ring (8) such that the cutting edges (10) cooperate, either in a nonpositive or positive manner, with the essentially smooth, cylindrical outer circumference of the pipe in order to lock the pipe against being pulled out.

In order to create a possibility for later detaching the pipeline (6), the housing (2) is composed of two parts, a base (20) and an insert (22), which are connected to each other such that they can be detached. In this regard, the insert (22) features an inner taper (14) in the region of a ring section (22a) which is closed in circumference, i.e., unslotted, such that after detaching the insert (22) from the base (20), the pipeline (6) can be removed together with the locking ring (8) and insert (22). The ring section (22a), due to its unslotted circumference, is sufficiently "dimensionally stable" to contain, by means of the tapered surface, radial force occurring due to contraction of the locking ring (8).

The insert (22) is preferably connected, i.e., locked or clipped to the base (20) in a detachable manner by means of a snap-action interlocking connection (24). For this purpose, it is preferable for the insert (22) to be composed of an eccentric ring (28) featuring an inner taper (14) which forms the unslotted ring section (22a) and can be at least partially inserted in the enlargement (26) of the receiver opening (4) of the base (20) (compare FIG. 3), and at least two elastic locking arms (30) arranged, in particular, uniformly distributed around the circumference (compare FIGS. 4 and 5). In this regard, a locking catch (32) of each locking arm (30) engages, in an outward radial direction, with a snap-in opening (34) of the base (20) in order to achieve a "genuine" positive locking, which has an undercut angle $\beta \geq 90°$ of the effective surface (compare FIGS. 2 and 2a). In this regard, the locking arms (30) extend, in essence, in an axial direction, i.e., approximately parallel to the plug-in axis (36). In the embodiment represented, two locking arms (30) are provided which, because they are distributed radially around the circumference in a uniform and symmetrical manner, are arranged diametrically opposed. It is preferable for the unslotted eccentric ring (28) to be supported by an annular step (38) inside the base (20) (see FIG. 3). It is preferable for the insert (22) to be manufactured as a one-piece plastic molding. It is preferable for the same to apply to the base (20).

As is furthermore revealed from FIGS. 1 and 2, each locking arm (30) advantageously features an operating section (40) projecting from and essentially axial to the base (20), i.e., parallel to the plug-in axis (36). Consequently, the operating sections (40) are accessible from the outside in order to allow the locking arms (30) to be manually actuated. In order to do so, the operating sections (40) are moved toward each other, radially inward, or in the direction of the pipeline (6), until the locking catches (32) are freed from the snap-in openings (34), thus canceling the positive lock. Then the pipeline (6) can be removed, together with the insert (22) and the locking ring (8).

According to FIG. 2a, it is particularly advantageous to form the locking connection (24) with an undercut angle $\beta > 90°$. For an emergence, or build-up, of a force $F_L$ acting in the detaching direction (arrow 16 in FIG. 2), this makes the retaining force $F_H$ increase correspondingly. This leads to greater security against an unintentional detaching of the pipeline (6).

In a particularly advantageous configuration of the invention, the insert (22) features an inner peripheral sealing lip (42) which comes to rest, in a sealing manner, on the outer peripheral surface of the pipeline (6). Before plugging in the pipeline (6), this flexible, elastic sealing lip (42) extends diagonally inward in the plug-in direction, according to FIG. 1, and is then expanded outward somewhat by means of the plugged-in pipeline (6), according to FIG. 2, such that it is supported by the latter in a manner forming a seal. The sealing lip (42) serves in particular to seal against dust, dirt and moisture (splashed water). The sealing lip (42) is incorporated likewise as a thin, lamella-like annular web.

As is also seen in FIGS. 1 and 2, it is preferable to arrange a sealing ring (44) for pressure-tight sealing on the side of the locking ring (8) facing away from the insert (22), between the locking ring and an annular step (46) of the base (20) (compare FIG. 3) in such a way that when a pipeline (6), which has been plugged in, is moved in the detaching direction (16) (FIG. 2), the latter entrains the locking ring (8), by means of the sealing ring (44), and thus advantageously moves to increase the binding power directed radially inward, against the inner taper (14).

In accordance with FIGS. 6–8 the connecting mechanism (1) or the housing (2) can be connected, according to the invention, to any optional unit part (50). For this purpose, the housing (2) features a plug-in section (54) which can be plugged into a plug-in opening (52) of the unit part (50) in a sealing manner, with this plug-in section (54) being retained in the plug-in opening (52), according to the invention, by means of a snap-action interlocking connection (56). It is particularly advantageous in this regard to have the snap-action interlocking connection (56) locked against detaching by means of a pipeline (6) which has been plugged in.

In the embodiment represented, this is achieved by the plug-in section (54) having at least one locking arm. However, it is preferable to provide at least two—as represented, four—locking arms (58), elastic radially, in particular, uniformly distributed around the circumference (radially symmetrical), and axially extending parallel to the plug-in axis (36). At least one locking catch (60) on each locking arm (58) clamps behind a stepped surface (62) of the unit part (50) in an interlocking manner. In this regard, it is also possible to provide for a configuration analogous to FIG. 2a. Here, it is advantageous to plug in the pipeline (6) through the receiver opening (4) up to the locking arm region in such a way that the locking arm (58), coming to rest on the pipeline (6), excludes a radial detaching movement of the locking arm (58). FIG. 8 represents this state. The stepped surface (62) which cooperates with the locking catches (60) to generate a positive lock is preferably formed by means of a groove-like annular enlargement (64) of the plug-in opening (52). Each of the preferably four locking arms (58) of the plug-in section (54) are formed and separated from each other by means of axial slots (66).

For this embodiment according to the invention, in accordance with FIGS. 6–8, the free end regions of the locking arms (58) feature inward-projecting support stays (68) to limit how far the pipeline can be plugged in. This function can be easily recognized in FIG. 8.

Rather than being limited to the embodiments represented and described, the invention also comprises all executions which operate in a like sense with the invention. Moreover, the invention can also be defined by any other optional combination of features which have been determined from all individual features disclosed as a whole.

I claim:

1. A connecting mechanism for connecting a plastic pipeline to a unit part having a mating opening to receive the connecting mechanism, the connecting mechanism comprising:

a housing selectively connectable to the unit part and having a receiver opening for plugging in a pipeline;

a retainer arranged in the receiver opening and operative to lock onto a, pipeline inserted into the receiver opening;

the housing having a plug-in section selectively connectable to the mating opening of the unit part and including a snap-action interlocking connection selectively operative to retain the plug-in section in the mating opening; and the snap-action interlocking connection having means adapted to cooperate with the inserted pipeline to lock the snap-action interlocking connection against detachment from the mating opening of the unit part, whereby the connecting mechanism is adapted to lock the unit part and the inserted pipeline.

2. The connecting mechanism of claim 1 for engagement with a stepped surface associated with the mating opening of the unit part, wherein the plug-in section comprises at least two radially elastic locking arms arranged uniformly distributed around the circumference of the plug-in section and extending substantially axially parallel to a plug-in axis of the plug-in section, with at least one locking catch on each locking arm for clamping behind the stepped surface of the unit part in an interlocking manner when the plug-in section is connected to the mating opening, wherein the pipeline is adapted to be inserted through the receiver opening for cooperation with the locking arms in such a way that the manner in which the locking arm is adapted to rest on the pipeline to prevent a radial detaching movement of the locking arm that would disengage the locking catches from the stepped surface.

3. The connecting mechanism of claim 2, wherein the plug-in section comprises four locking arms, between each of which is formed an axial slot.

4. The connecting mechanism of claim 2, characterized in that free end regions of the locking arms have inner support stays operative to limit insertion of the pipeline and into the receiver opening.

5. The connecting mechanism of claim 1, wherein the housing, for the purpose of making the pipeline detachable, is of a two-piece construction, with a base and an insert which is adapted to be connected to the base, such that the insert can be detached from the base to detach the pipeline from the remainder of the connecting mechanism.

6. The connecting mechanism of claim 5, wherein the insert is connected to the base by means of a snap-action interlocking connection.

7. The connecting mechanism of claim 5, wherein the insert comprises an eccentric ring which has an inner taper and is selectively inserted in an enlargement of the receiver opening of the base, and at least two elastic locking arms uniformly distributed around the circumference of the eccentric ring, with a locking catch associated with each locking arm engaging with a snap-in opening of the base.

8. The connecting mechanism of claim 7, characterized in that each locking arm (30) features an operating section (40) projecting out from the base (20).

9. The connecting mechanism of claim 5, wherein the insert has an inner, circumferential sealing lip which is adapted to comes to rest in a sealing manner on an outer circumferential surface of the pipeline.

10. The connecting mechanism of claim 5, further comprising a sealing ring arranged on the side of retainer facing away from the insert adapted to be inserted between the retainer and an annular step of the base, the retainer having an outer taper that cooperates with a complementary inner taper of the housing, said sealing ring adapted to entrain the inserted pipeline when the pipeline is moved in a detaching direction, and wherein said movement moves the retainer against the inner taper in order to increase the radial binding power of the retainer.

\* \* \* \* \*

UNITED STATES PATENT AND TRADEMARK OFFICE
CERTIFICATE OF CORRECTION

PATENT NO. : 5,782,501

DATED : July 21, 1998

INVENTOR(S) : Josef Brandt

It is certified that error appears in the above-identified patent and that said Letters Patent is hereby corrected as shown below:

Column 4, line 52, cancel the comma (,) immediately following "a".

Column 5, line 19, cancel "and".

Column 6, line 13, change "comes" to -- come --.

Signed and Sealed this

Twelfth Day of January, 1999

*Attest:*

*Attesting Officer*  *Acting Commissioner of Patents and Trademarks*